United States Patent [19]

Eastmond et al.

[11] Patent Number: 5,226,178
[45] Date of Patent: Jul. 6, 1993

[54] COMPATIBLE NOISE REDUCTION SYSTEM

[75] Inventors: Bruce C. Eastmond, Downers Grove; Elliott W. L. Lum, Palatine, both of Ill.

[73] Assignee: Motorola, Inc., Schaumburg, Ill.

[21] Appl. No.: 660,488

[22] Filed: Feb. 25, 1991

Related U.S. Application Data

[63] Continuation-in-part of Ser. No. 429,957, Nov. 1, 1989, abandoned.

[51] Int. Cl.$^5$ .................. H04B 7/65; H04B 1/00; H04B 1/06
[52] U.S. Cl. ........................ 455/23; 455/43; 455/72; 455/232.1
[58] Field of Search ............. 455/10, 23, 20, 24, 455/33.1, 56.1, 57.1, 52.3, 72, 43, 63, 15, 234.2, 235.1, 241.1, 245.1, 250.1, 296, 300; 333/14; 330/279

[56] References Cited

U.S. PATENT DOCUMENTS

| | | | |
|---|---|---|---|
| 4,270,103 | 5/1981 | Schroder | 333/14 |
| 4,514,703 | 4/1985 | Maher et al. | 330/279 |
| 4,747,143 | 5/1988 | Kroeger et al. | 455/245.1 |
| 4,893,347 | 1/1990 | Eastmond et al. | 455/52.3 |
| 4,893,349 | 1/1990 | Eastmond et al. | 455/205 |

Primary Examiner—Reinhard J. Eisenzopf
Assistant Examiner—Lisa Charouel
Attorney, Agent, or Firm—Wayne J. Egan

[57] ABSTRACT

A compatible noise reduction system is provided. The compatible noise reduction system, according to the invention, provides a significant improvement in the audio quality of existing land mobile radio equipment and systems, especially in those areas where multipath propagation and/or simulcast overlap coverage exists. Unlike prior art noise reduction systems, the compatible noise reduction system, according to the invention, is interoperable with radio equipment that has standard audio processing.

26 Claims, 5 Drawing Sheets

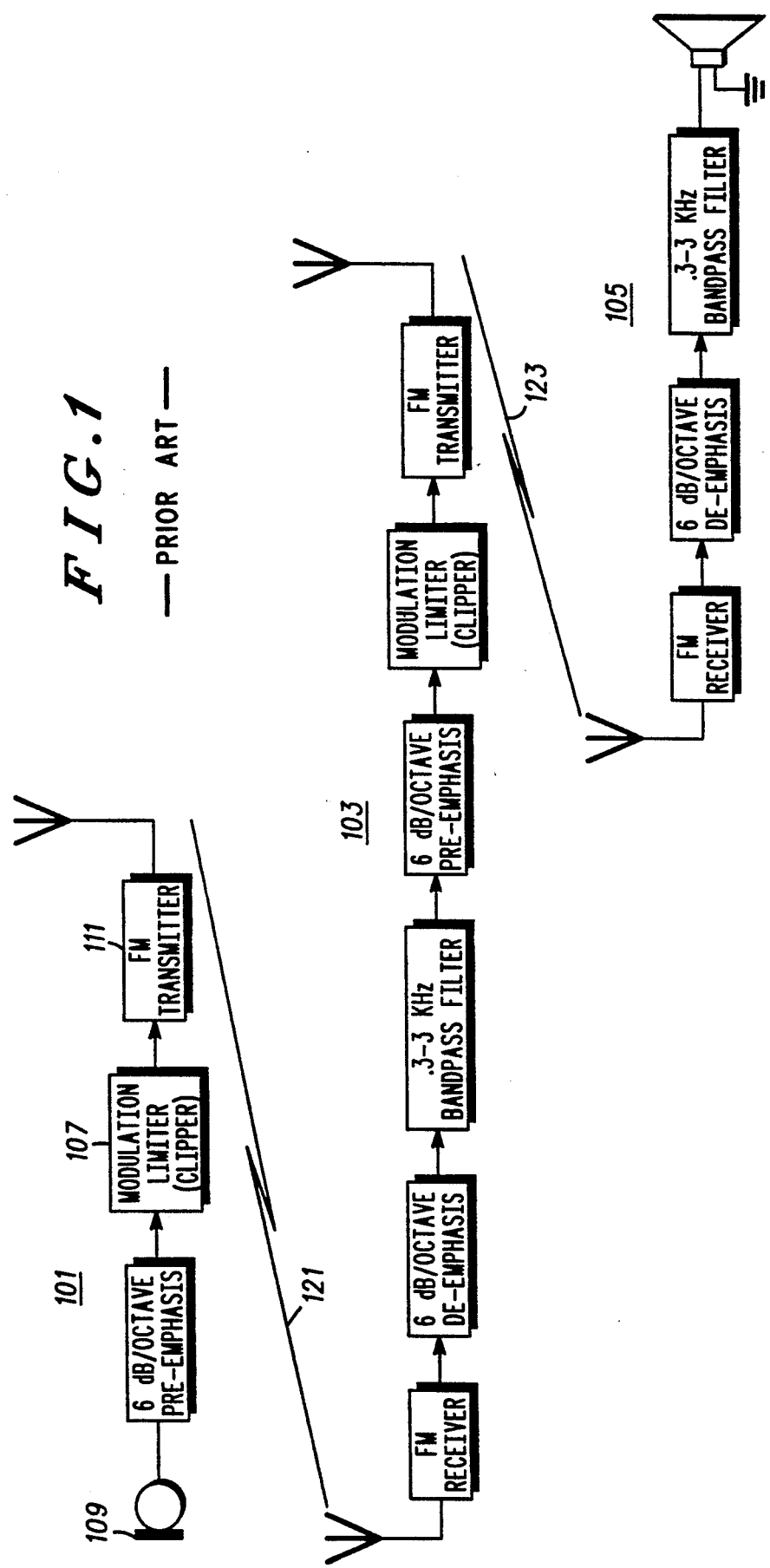

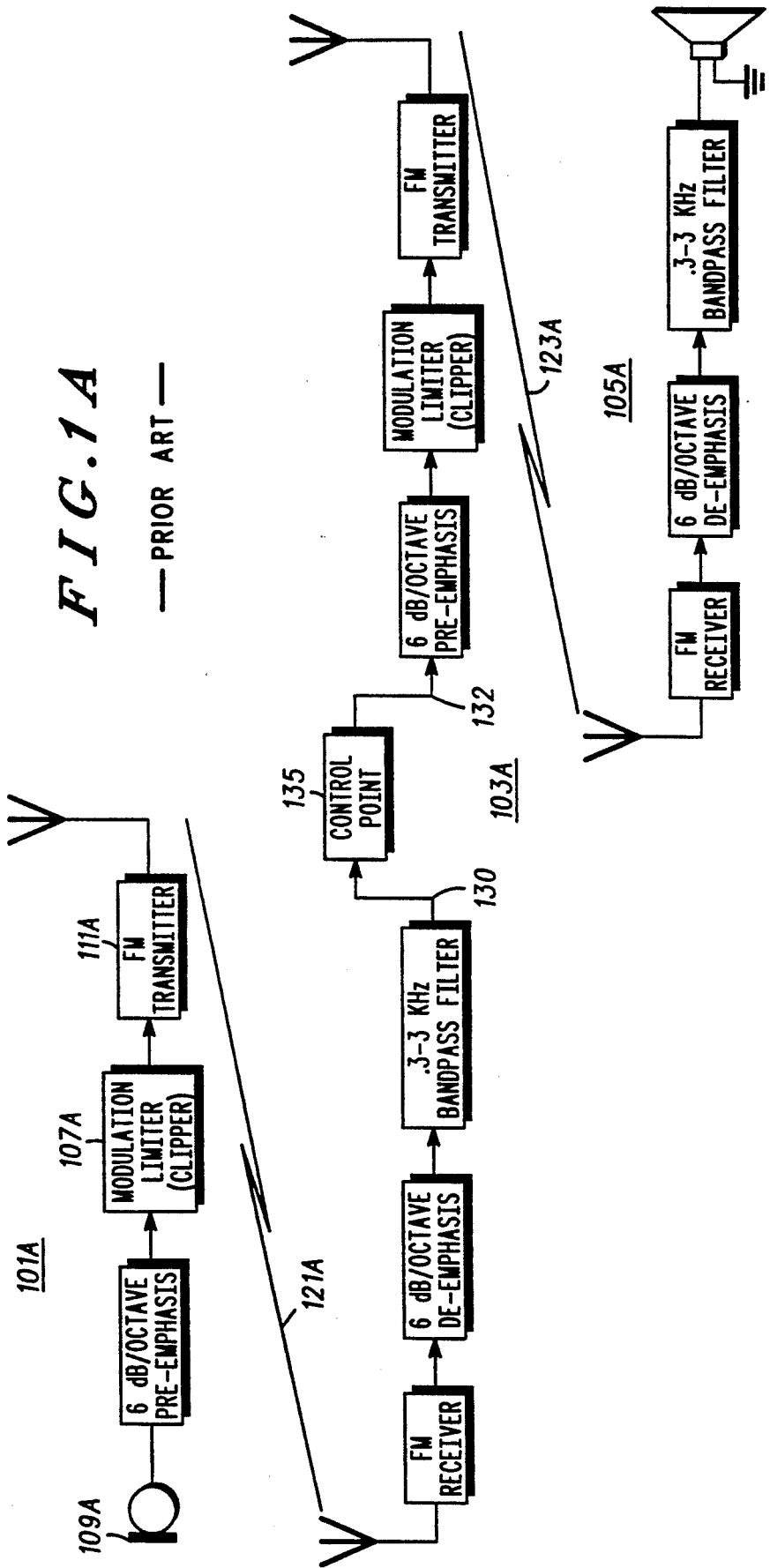

COMPATIBLE NOISE REDUCTION SYSTEM

This is a continuation-in-part of prior application Ser. No. 07/429,957, filed Nov. 1, 1989, now abandoned, which prior application is hereby incorporated by reference verbatim, as though the same were fully set forth herein.

TECHNICAL FIELD

This application relates to noise reduction systems and more particularly noise reduction systems for use in land-mobile radio systems.

PRIOR U.S. PATENT INCORPORATED BY REFERENCE

The applicant hereby incorporates by reference John W. Maher, et al., U.S. Pat. No. 4,514,703, issued Apr. 30, 1985, assigned to Motorola, Inc., hereinafter "Maher", as though the same were fully set forth herein.

BACKGROUND OF THE INVENTION

Syllabic amplitude companding has been used for decades in wire-line telephone systems to reduce noise and crosstalk. Their first application to wire lines in the U.S. was made in the early 1940's by the Bell System. See, for example, Carter, Jr., C. W., et al., "Application of Compandors to Telephone Circuits," AIEE Transactions, Vol. 65, 1946, pp. 1079–1086, hereinafter referred to as "Carter". These early discrete-component compandors typically employed copper oxide varistors as gain control elements and were not suited for mobile radio applications. Telephone systems provide an ideal environment for companding since the wire-line channel does not typically include amplitude limiting or frequency shaping.

As is known, a compander consists of two units, a compressor and an expandor. The compressor and the expandor complement each other. Therefore, if the compressor inserts amplification in the channel, the expandor inserts an equal attenuation. By allowing the system to transmit at a higher signal level, the noise is reduced.

The realization that companding may reduce the level of noise and co-channel interference between speech syllables prompted an interest in its application to cellular telephone systems. Subsequently, compandor integrated circuits (IC's) were developed that made the use of companding practical for use in cellular telephone systems. Recently companding has been introduced to non-cellular land mobile radio systems in the radio spectrum at 900 MHz.

See, for instance, U.S. patent application Ser. No. 90,982, filed on Aug. 28, 1987, entitled "FM Communication System with Improved Response to Rayleigh-Faded Companded Signals," by applicants Bruce C. Eastmond (one of the applicants of the present application) and Donald L. Linder, and assigned to Motorola, Inc., now U.S. Pat. No. 4,893,347, granted Jan. 9, 1990, hereinafter referred to as "prior application Ser. No. 90,982".

See, also, U.S. patent application Ser. No. 91,160, also filed on Aug. 28, 1987, entitled "FM Communications System with Improved Response to Rayleigh-Faded Received Signals," by applicants Bruce C. Eastmond and Elliott W. Lum (the identical applicants of the present application), and also assigned to Motorola, Inc., now U.S. Pat. No. 4,893,349, granted Jan. 9, 1990, hereinafter referred to as "prior application Ser. No. 91,160".

Another compander system of the prior art is disclosed in Ernst Schroder, U.S. Pat. No. 4,270,103, issued May 26, 1981, hereinafter referred to as "Schroder".

It is a well-known characteristic of some prior art companding systems that both the compressor and expandor must be present in order to prevent unnatural sounding speech. As a consequence, companding has not been applied to land mobile radio systems due to the large existing equipment base which has conventional speech processing.

FIG. 1 shows a first prior art repeater system which uses standard land mobile transit and receive speech processing. There is shown a first subscriber 101 transmitting to a repeater 103 via a first radio path 121. There is also shown the repeater 103 transmitting to a second subscriber 105 via a second radio path 123. FIG. 1A shows a second prior art land mobile radio system which uses standard transmit and receive speech processing. There is shown a first subscriber 101A transmitting to a repeater 103A via a first radio path 121A. There is also shown the repeater 103A transmitting to a second subscriber 105A via a second radio path 123A. The speech signal originating at the repeater receiver which is present at output 130 is connected to control point 135, and the speech signal originating at control point 135 is connected to repeater transmitter modulation input 132.

The amplitude response of the prior art transmit and receive speech processing measured at 1 KHz is shown in FIG. 3 by curve 301 and in FIG. 4 by curve 401. The end-to-end response of the prior art speech processing is shown in FIG. 5 by curve 501. This approach has existed unchanged for decades. The modulation limiter 107A is required to prevent the transmitter from producing deviations due to modulation in excess of a rated system deviation. See, for instance, EIA Standard RS-316-B, May 1979, page 13. Since the typical microphone 109A output signal is 8.5 dB above the clipping threshold, the modulation limiter 107A also acts to raise the peak-to-average ratio of the speech signal frequency deviation which will improve the effective communications range of the transmitter 111A. The use of a clipper to improve the peak-to-average ratio of the speech signal is characteristic of land mobile and military narrow-band FM radio systems, and distinguishes these systems from commercial FM broadcast and radiotelephone systems in which the typical microphone output signal is substantially below the clipping threshold so that the dynamic range of the modulation is preserved without excessive distortion.

The choice of the clipping threshold involves a compromise between the amount of peak-to-average ratio improvement and the amount of distortion present in the received signal. The presence of speech signal distortion may affect the readability of the speech signal and also increases the level of spurious emissions, sometimes called "splatter", at adjacent channel frequencies. It is possible that the microphone signal may greatly exceed the typical level 309 in FIG. 3 if, for example, the person transmitting is in danger or excited for some reason. Situations of this kind occur frequently in police or public safety radio systems and often produce highly distorted, difficult to understand transmissions at critical moments. It is also possible that the microphone signal may be significantly less than the typical level 309 in FIG. 3 if, for example, the person transmitting is not close to the microphone or does not speak loudly.

SUMMARY OF THE INVENTION

Therefore, it is an object of the present invention to provide improved speech processing for a land mobile radio system that is interoperable with radio equipment which has standard speech processing.

It is another object of the present invention to provide improved speech processing for a land mobile radio repeater system that provides a significant reduction in received noise, especially in those areas where multipath propagation and/or simulcast overlap coverage exists.

It is another object of the present invention to provide improved speech processing for a land mobile radio repeater system that is interoperable with radio equipment which has standard speech processing and in which excessive modulation limiter distortion is prevented for microphone signals having amplitudes that are in excess of typical levels.

It is another object of the present invention to provide improved speech processing for a land mobile radio repeater system in which the level of the speech signal received at the repeater is maintained constant.

In order to achieve these objects the invention employs various combinations of the following elements:

syllabic amplitude companding with a modified amplitude response characteristic;

a flutter fighter that selectively attenuates the audio signal output from the base and subscriber unit receivers and enhances the operation of the expandor; and, a speech controlled AGC circuit that normalizes or regulates the amplitude of the repeater receiver audio output so as to maintain the modulation level of the repeater constant.

BRIEF DESCRIPTION OF THE DRAWINGS

FIG. 1 is a block diagram that shows a typical land mobile repeater system, as in the prior art.

FIG. 1A is a block diagram that shows a typical land-mobile repeater system in which connection is made to a remote point, as in the prior art.

DETAILED DESCRIPTION OF THE INVENTION

Figure 2:
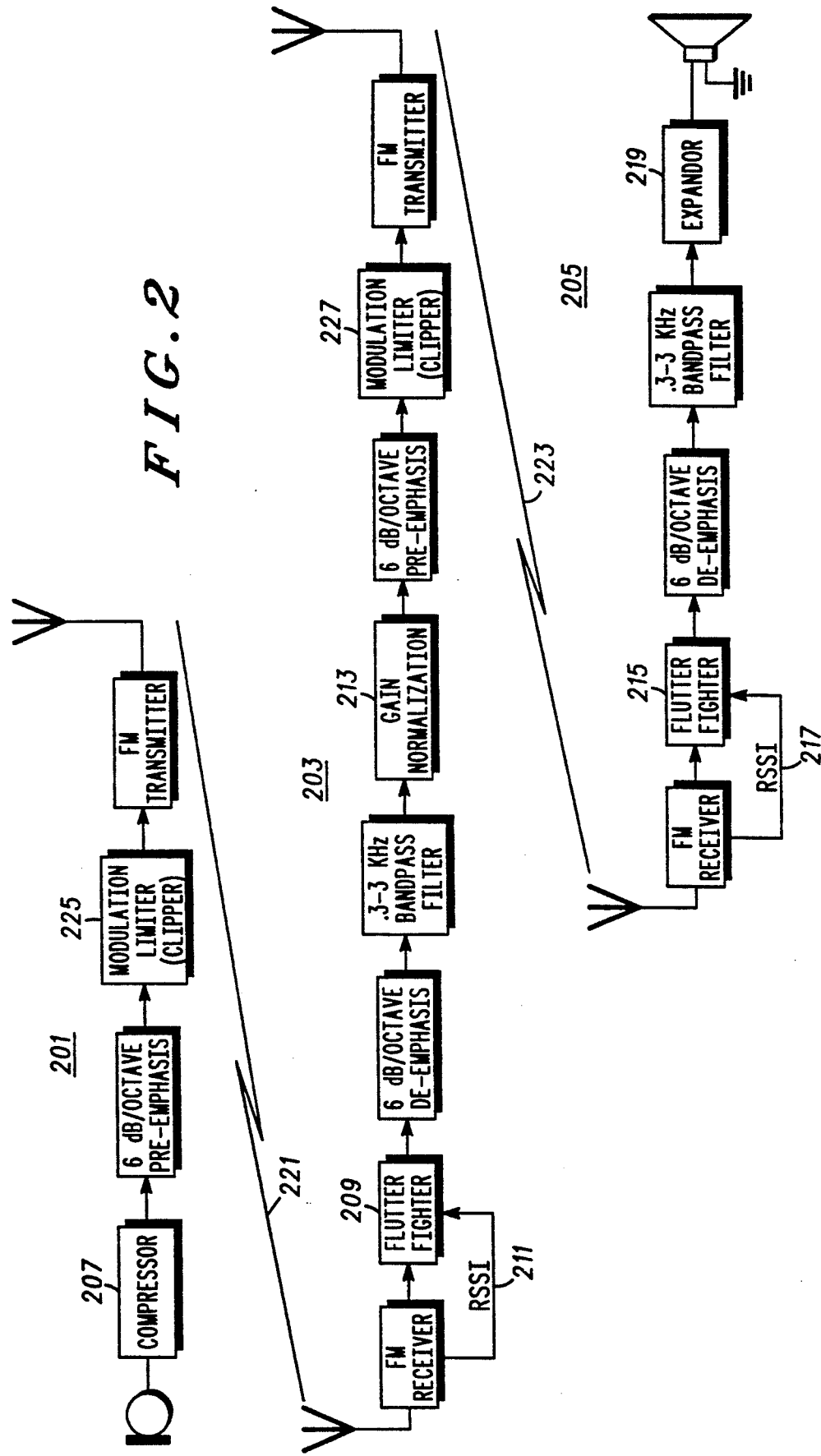
FIG. 2 is a block diagram that shows a first embodiment of a compatible noise reduction system, according to the invention.

FIG. 2 is a block diagram that shows a first embodiment of a compatible noise reduction system, according to the invention. There is shown a first subscriber unit 201 transmitting to a repeater 203 via a first RF communications path 221. There is also shown the repeater 203 transmitting to a second subscriber unit 205 via a second RF communications path 223.

Figure 2A:
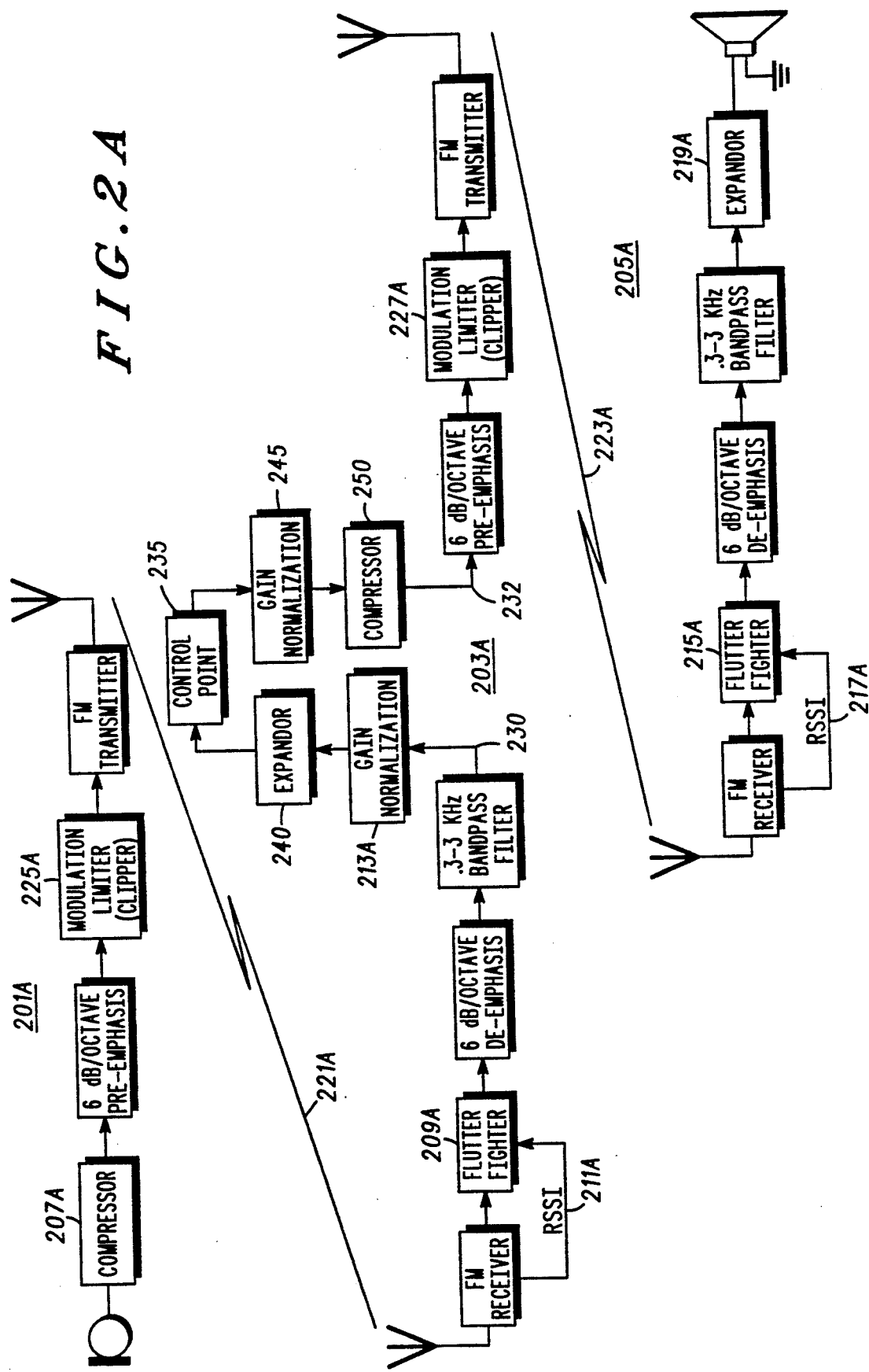
FIG. 2A is a block diagram that shows a second embodiment of a compatible noise reduction system, according to the invention, in which connection is made to a remote point.

FIG. 2A is a block diagram that shows a second embodiment of a compatible noise reduction system, according to the invention. There is shown a first subscriber unit 201A transmitting to a repeater 203A via a first RF communications path 221A. There is also shown the repeater 203A transmitting to a second subscriber unit 205A via a second RF communications path 223A. The speech signal originating at the repeater receiver which is present at output 230 is processed by gain normalization 213A and by expandor 240 prior to connection to control point 235. The speech signal originating at control point 235 is processed by gain normalization 245 and compressor 250 prior to connection to repeater transmitter modulation input 232.

Figure 3:
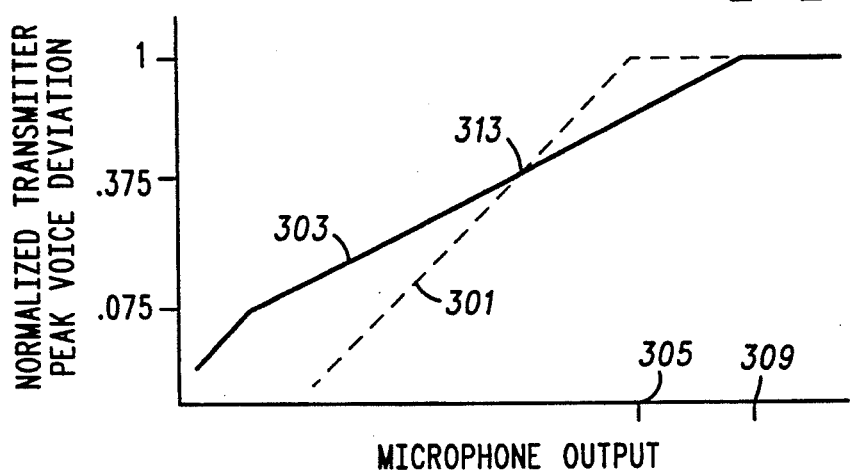
FIG. 3 is a graph showing the transmit voice processing for the prior art and for a typical system according to the invention.
Figure 4:
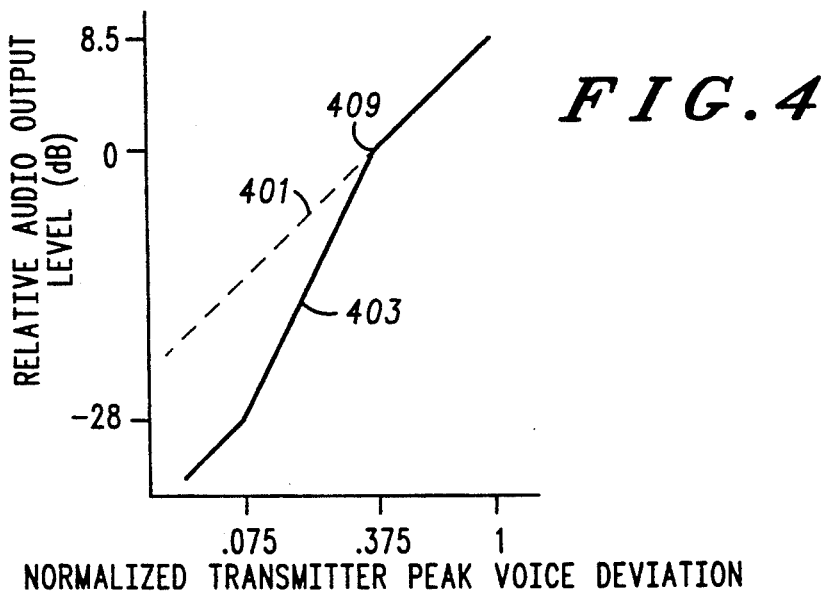
FIG. 4 is a graph showing the receive mode voice processing for the prior art and for a typical system according to the invention.
Figure 5:
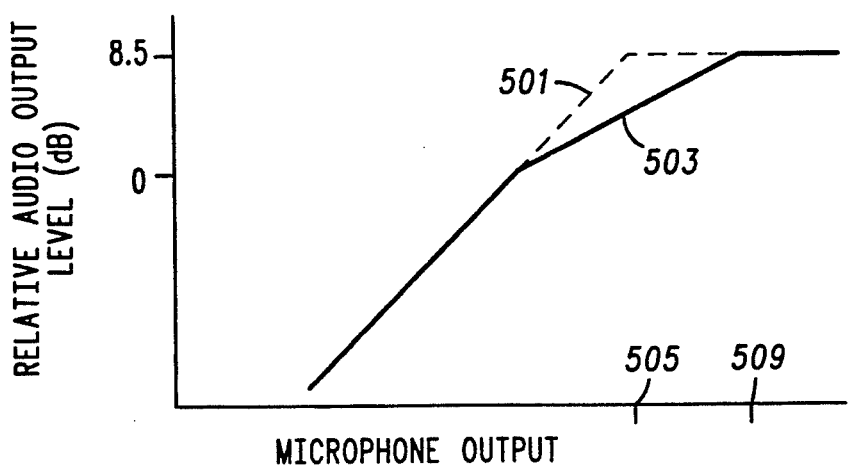
FIG. 5 is a graph showing the system amplitude response for the prior art and for a typical system according to the invention.

The amplitude response of the transmit and receive speech processing, according to the invention, measured at 1 KHz is shown in FIG. 3 by curve 303, and in FIG. 4 by curve 403, and the end-to-end system response, according to the invention, is shown in FIG. 5 by curve 503. The compressor and expandor are further characterized by equal gain points 313 and 409, each of which represents the unique input level at which the output level is the same with companding in as it is with commanding out.

Although fully-equipped remote units 201 or 205 as in FIG. 2 or 201A or 205A as in FIG. 2A experience the maximum benefit from the enhanced speech processing, a remote unit 101 or 105 as in FIG. 1 with standard speech processing is compatible with the systems of FIGS. 2 or 2A.

Note in FIGS. 3 and 4 that the amplitude response of compressors 207, 207A and 250 does not complement the amplitude response of expandors 219, 219A and 240 at large signal levels: the expandors revert to constant gain (1:1 slope) at high input signal levels, but the compressors do not. As a consequence of the non-complementary compressor and expandor characteristics the end-to-end amplitude response shown in FIG. 5 will differ from that of standard speech processing near the clipping threshold. This difference in response has little effect on the average received speech level since the response is altered only near the clipping threshold 305 in FIG. 3 and 505 in FIG. 5.

If the compressors were to revert to constant gain at high signal levels then the clipping threshold for a compatible noise reduction system, according to the invention, and standard transmit processing would be the same and the modulation distortion problems of standard speech processing discussed previously would remain. However, if the slope of the compressors would continue to be 1:2 at high signal levels then the clipping threshold 305 in FIG. 3 and 505 in FIG. 5 is effectively increased to coincide with the typical microphone output level 309 in FIG. 3 and 509 in FIG. 5 which will result in significantly reduced modulation distortion, especially under overload conditions.

At low signal levels both the compressors and the expandors revert to constant gain in a complementary manner. This is done for at least two reasons, as follows:

(a) to limit the increase in low-level background noise which would occur between syllables if the compressor were used without the expandor (see, for example, Schroder, col. 3, lines 30-37); and, (b) to alleviate the gain errors and time constant changes which commonly occur in compandors at low signal levels (see, for example, Carter; see, also, Signetics Linear Products Application Note AN176).

At high signal levels the expandors revert to constant gain for at least two reasons, as follows:

(a) to prevent exaggeration of the loudest peaks of the speech signal which would produce unnatural sounding speech when the expandor is used without the compressor (see, for example, Schroder, col, 3, lines 37–41); and, (b) to alleviate the spurious amplitude peaks which occur when the compressors and expandors are present but are prevented from operating in a complementary manner by the modulation limiters 225 and 227, or 225A and 227A (see, for example, prior application Ser. No. 90,982).

Beside companding, the speech processing systems in FIGS. 2 and 2A also include flutter fighters 209 and 215, and 209A and 215A associated with each FM receiver in the system (see, for example, prior application Ser. No. 90,982) to remove noise bursts from the speech signals, and speech-controlled automatic gain controls (AGC) 213 and 213A (see, for example, Maher; see, also, prior application Ser. No. 91,160). The flutter fighter as described in prior application Ser. No. 90,982 may be used with the expandors to reduce multipath noise. The multipath noise bursts, if not attenuated by the flutter fighter, would maintain the gain of the expandors at a high level and reduce their ability to mute intersyllabic noise. Gain normalization has been described by Maher, and by prior application Ser. No. 91,160 for use with a SONAD. The SONAD (Speech Operated Noise Attenuation Device) is a receive-end speech processor similar in operation to an expandor. Unlike an expandor, however, it is intended to operate without complementary transmit-end processing. Prior application Ser. No. 91,160 describes a system in which a variation of the SONAD that will pass low-frequency data signals is employed in the repeater audio path (see FIG. 21 therein). Gain normalization is necessary to ensure that the expandors will not attenuate softly-spoken speech signals which have not been processed by a compressor. Prior art syllabically-companding speech processing systems such as that described by Schroder are not concerned with the change in speech signal amplitude that may occur when an expandor having the characteristics shown in FIG. 4, curve 403, is used to process softly-spoken speech syllables which have not been processed by a compressor.

The transmit speech processing of a compatible noise reduction system, according to the invention, includes both a modulation limiter and an optional compressor. The modulation limiter must be present. The transmit speech processing described by Schroder, on the other hand, is an optional compressor. The notion of modulation limiting, which significantly alters the tracking between a compressor and expandor, is not disclosed by Schroder.

The compressors in a compatible noise reduction system, according to the invention, reverts to a constant gain at low input signal levels only, while the compressor in Schroder's system reverts to a constant gain at both low and high input signal levels. Reverting to constant gain at low signal levels in the compressor has been implemented in systems dating back to the 1940's as discussed by Carter. Reverting to a constant gain at high input signal levels will lead to greater speech distortion when a modulation limiter is employed as discussed previously.

While various embodiments of a compatible noise reduction system, according to the present invention, have been described hereinabove, the scope of the invention is defined by the following claims.

What is claimed is:

1. An FM repeater communication system having improved audio response to multipath propagation and modulation limiter distortion, said FM communication system comprising;

remote transmitter means including microphone means for providing a microphone output signal and first modulation limiting means for transmitting inbound speech signals via an inbound FM signal;

base receiver means for receiving said inbound FM signal, said receiver means including first noise attenuation means for selectively minimizing noise bursts in said inbound speech signals;

base transmitter means including second modulation limiting means for transmitting outbound speech signals via an outbound FM signal;

audio processing means connected between said base receiver means and said base transmitter means, said audio processing means including AGC means for regulating a normalized transmitter peak voice deviation of said inbound speech signals to be at a substantially constant level when applied to said second modulation limiting means; and, remote receiver means for receiving said outbound FM signal;

in which the AGC means includes speech detection means for enabling said AGC means to change the normalized transmitter peak voice deviation of said inbound speech signals only when speech activity is being detected, thereby preventing said AGC means from increasing amplification of said inbound speech signals during pauses in the speech activity, in which the remote transmitter means further includes syllabic compressor means following said microphone means, and in which said syllabic compressor means has an equal gain point corresponding to a product of 0.375 and the normalized transmitter peak voice deviation in kHz.

2. An FM repeater communication system according to claim 1 in which the syllabic compressor means includes a first modifying means for preventing compression of said microphone output signal below a predetermined input level set relative to a limiting level of said first modulation means.

3. An FM repeater communication system according to claim 2 in which the first modifying means alters a compression characteristic of said syllabic compressor means from a 1:2 output/input slope above the predetermined input level to a 1:1 output/input slope slope below the predetermined input level.

4. An FM repeater communication system according to claim 3 in which the predetermined input level is that which produces a product of 0.075 and the normalized transmitter peak voice deviation in kHz.

5. An FM repeater communication system according to claim 1 in which the remote receiver means further includes:

second noise attenuation means for selectively minimizing noise bursts in said outbound speech signal; and syllabic expandor means for expanding the noise-minimized outbound speech signals.

6. An FM repeater communication system having improved audio response to multipath propagation and modulation limiter distortion, said FM communication system comprising;

remote transmitter means including microphone means for providing a microphone output signal and first modulation limiting means for transmitting inbound speech signals via an inbound FM signal;

base receiver means for receiving said inbound FM signal, said receiver means including first noise attenuation means for selectively minimizing noise bursts in said inbound speech signals;

base transmitter means including second modulation limiting means for transmitting outbound speech signals via an outbound FM signal;

audio processing means connected between said base receiver means and said base transmitter means, said audio processing means including AGC means for regulating a normalized transmitter peak voice deviation of said inbound speech signals to be at a substantially constant level when applied to said second modulation limiting means; and, remote receiver means for receiving said outbound FM signal;

and in which the AGC means includes speech detection means for enabling said AGC means to change the normalized transmitter peak voice deviation of said inbound speech signals only when speech activity is being detected, thereby preventing said AGC means from increasing the amplification of said inbound speech signals during pauses in the speech activity;

and in which the remote receiver means further includes;

second noise attenuation means for selectively minimizing noise bursts in said outbound speech signal; and syllabic expandor means for expanding the noise-minimized outbound speech signals; and in which said syllabic expandor means has an equal gain point corresponding to a product of 0.375 and the normalized transmitter peak voice deviation in kHz.

7. An FM repeater communication system according to claim 6 in which the syllabic expandor means includes a second modifying means for preventing expansion of said outbound speech signal above a first predetermined input level set relative to a limiting level of said second modulation limiting means and below a second predetermined input level set relative to the limiting level of said second modulation limiting means.

8. An FM repeater communication system according to claim 7 in which the second modifying means alters an expansion characteristic of said syllabic expandor means from a 1:2 output/input slope between the first and second predetermined input levels to a 1:1 output/input slope above the first predetermined input level and below the second predetermined input level.

9. An FM repeater communication system according to claim 8 in which the first predetermined input level is that which produces a product of 0.375 and the normalized transmitter peak voice deviation in KHz and the second predetermined input level is that which produces a product of 0.075 and the normalized transmitter peak voice deviation in kHz.

10. An FM repeater communication system having improved audio response to multipath propagation and modulation limiter distortion, said FM communication system comprising:

remote transmitter means including microphone means for providing a microphone output signal and first modulation limiting means for transmitting inbound speech signals via an inbound FM signal;

base receiver means for receiving said inbound FM signal, said receiver means including first noise attenuation means for selectively minimizing noise bursts in said inbound speech signal;

first syllabic expandor means following said receiving means for expanding the noise-minimized speech signal output from the base receiver means, the first syllabic expandor means including an input and an output, the output of said first syllabic expandor means connected to a control point at which the inbound speech signals are received;

first AGC means connected between an output of said base receiver means and the input of said first syllabic expandor means for regulating a normalized transmitter peak voice deviation of said inbound speech signals to be at a substantially constant level;

base transmitter means including second modulation limiting means for transmitting outbound speech signals via an outbound FM signal, the base transmitter means including a modulation input;

first syllabic compressor means preceding said base transmitter means, the first syllabic compressor means including an input and an output, the output of said first syllabic compressor means connected to the modulation input of said base transmitter means;

second AGC means connected between said control point and the input of said first syllabic compressor means for regulating the normalized transmitter peak voice deviation of inbound speech signals originating at said control point to be at the substantially constant level; and, remote receiver means for receiving said outbound FM signal.

11. An FM communication system according to claim 10 in which said first and second AGC means include speech detection means for enabling said first and second AGC means to change the normalized transmitter peak voice deviation of said received speech signals only when speech activity is being detected, thereby preventing said first and second AGC means from increasing amplification of the inbound speech signals during pauses in the speech activity.

12. An FM repeater communication system according to claim 11 in which the remote transmitter means further includes second syllabic compressor means following said microphone means.

13. An FM repeater communication system according to claim 12 in which said first and second syllabic compressor means has an equal gain point corresponding to a product of 0.375 and the normalized transmitter peak voice deviation in kHz.

14. An FM repeater communication system according to claim 13 in which the first and second syllabic compressor means includes a first modifying means for preventing compression of said microphone output signal below a predetermined input level set relative to the limiting level of said first modulation limiting means.

15. An FM repeater communication system according to claim 14 in which the first modifying means a compression characteristic of said first and second syllabic compressor means from a 1:2 output/input slope above the predetermined input level to a 1:1 output/input slope slope below the predetermined input level.

16. An FM repeater communication system according to claim 15 in which the predetermined input level is that which produces a product of 0.075 and the normalized transmitter pack voice deviation in kHz.

17. An FM repeater communication system according to claim 12 in which the remote receiver means further includes:
second noise attenuation means for selectively minimizing noise bursts in said outbound speech signal; and
second syllabic expandor means for expanding the noise-minimized outbound speech signals.

18. An FM repeater communication system according to claim 17 in which said first and second syllabic expandor means has an equal gain point corresponding to a product of 0.375 and the normalized transmitter peak voice deviation in kHz.

19. An FM repeater communication system according to claim 18 in which the first and second syllabic expandor means includes a second modifying means for preventing expansion of said outbound speech signal above a first predetermined input level set relative to a limiting level of said second modulation limiting means and below a second predetermined input level set relative to the limiting level of said second modulation limiting means.

20. An FM repeater communication system according to claim 19 in which the second modifying means alters an expansion characteristic of said first and second syllabic expandor means from a 1:2 output/input slope between the first and second predetermined input levels to a 1:1 output/input slope above the first predetermined input level and below the second predetermined input level.

21. An FM repeater communication system according to claim 20 in which the first predetermined input level is that which produces a product of 0.375 and the normalized transmitter peak voice deviation in kHz and the second predetermined input level is that which produces a product of 0.075 and the normalized transmitter peak voice deviation in kHz.

22. An FM communication system having improved audio response to multipath propagation and modulation limiting distortion, said FM communication system comprising:
transmitter means for transmitting speech signals via an FM signal, said transmitter means including modulation limiting means and including AGC means for regulating a normalized transmitter peak voice deviation of said speech signals;
receiver means for receiving the FM signal, the receiver means including noise attenuation means for selectively minimizing noise burst in the speech signals thereby forming noise-minimized speech signals; and,
syllabic expandor means for expanding the noise-minimized speech signals.

23. The FM communication system of claim 22 in which said syllabic expandor means includes an expansion characteristic comprising an equal gain point corresponding to a product of 0.375 and the normalized transmitter peak voice deviation in kHz.

24. The FM repeater communication system of claim 23 in which the syllabic expandor means includes a modifying means including a limiting level for preventing expansion of said noise-minimized speech signals above a first predetermined input level set relative to a limiting level and for preventing expansion of said noise-minimized speech signals below a second predetermined input level set relative to the limiting level.

25. The FM repeater communication system of claim 24 in which the modifying means is arranged for altering the expansion characteristic from a 1:2 output/input slope between the first and second predetermined input levels to a 1:1 output/input slope above the first predetermined input level and below the second predetermined input level.

26. The FM repeater communication system of claim 25 in which the first predetermined input level is that which produces a product of 0.375 and the normalized transmitter peak voice deviation in kHz and the second predetermined input level is that which produces the product of 0.075 and the normalized transmitter peak voice deviation in kHz.

* * * * *

UNITED STATES PATENT AND TRADEMARK OFFICE
CERTIFICATE OF CORRECTION

PATENT NO. : 5,226,178

DATED : July 6, 1993

INVENTOR(S) : Bruce C. Eastmond and Elliott W. L. Lum

It is certified that error appears in the above-identified patent and that said Letters Patent is hereby corrected as shown below:

In the claims:

At column 8, line 61, "KHZ" should be --$kH_z$--.

At column 9, line 2, "means a" should be --means alters a--.

At column 10, line 14, "burst" should be --bursts--.

Signed and Sealed this

Twelfth Day of April, 1994

Attest:

BRUCE LEHMAN

*Attesting Officer*     *Commissioner of Patents and Trademarks*